United States Patent [19]

Brandt

[11] Patent Number: 4,727,535

[45] Date of Patent: Feb. 23, 1988

[54] TELEPHONE NETWORK COUPLER

[75] Inventor: Randy Brandt, Orange, Calif.

[73] Assignee: Rapitech System Inc., Suffern, N.Y.

[21] Appl. No.: 721,038

[22] Filed: Apr. 8, 1985

[51] Int. Cl.⁴ ............................................. H04B 9/00
[52] U.S. Cl. ..................................... 370/32; 250/551; 379/379; 455/602
[58] Field of Search ............... 370/32; 455/606, 602, 455/607, 618, 619; 179/170.2, 170.6, 18 FA; 250/551; 379/379, 394, 400, 401

[56] References Cited

U.S. PATENT DOCUMENTS

| | | | |
|---|---|---|---|
| 4,056,719 | 11/1977 | Waaben | 455/607 |
| 4,133,982 | 1/1979 | Lee et al. | 179/18 FA |
| 4,243,890 | 1/1981 | Miller et al. | 250/551 |
| 4,282,604 | 8/1981 | Jefferson | 250/551 |
| 4,365,164 | 12/1982 | Siblex | 307/311 |
| 4,558,183 | 12/1985 | Corris et al. | 179/18 FA |

FOREIGN PATENT DOCUMENTS 2748522 4/1979 Fed. Rep. of Germany ........ 179/18 FA

*Primary Examiner*—Joseph A. Orsino, Jr.
*Attorney, Agent, or Firm*—Herb Boswell

[57] ABSTRACT

An analog coupling device for coupling a telephone to a telephone network circuit while maintaining isolation of the two circuits has an optical emitting element and an optical receiving element in the network circuit. The telephone circuit includes an optical receiving element optically coupled with the network circuit optical emitting element. The telephone circuit optical receiving element has a reversed biased pn junction. The telephone circuit further includes an optical emitting element which is optically coupled with the network optical receiving element.

35 Claims, 2 Drawing Figures

TELEPHONE NETWORK COUPLER

BACKGROUND OF INVENTION

This invention relates to a telephone communications interface coupler and, in particular, an optically coupled 2 wire to 4 wire coupler comprising two optical coupled devices which are capable of coupling signals to and from a telephone line while maintaining circuit isolation and automatic gain control.

Telephone systems worldwide include a DC current which is overlaid with an AC signal current. This DC current is generally provided utilizing 48 volt batteries which are located at the telephone central office. Depending upon the distance of the particular user from the central office, the current from that 48 volt battery can range, as for instance, from about 5 ma to about 120 ma.

In PBX systems and other switching systems, it is necessary to utilize outside power supplies to drive these pieces of equipment. Because the DC current, which is provided by the central office of the telephone company, is grounded differently than the outside power supplied to the PBX or other switching systems, it is necessary to isolate these two circuits in order to avoid erroneous operations of the telephone system. Inductive telephone 2 to 4 wire transformers are currently the only known devices which are suitable for use in isolation of these two electrical circuits.

In certain instances, optical coupled devices have been utilized for circuit isolation. However, because of the variability of the telephone DC currents and the loading on telephone networks, the various standard techniques incorporating optical couplers for audioo transmission and/or isolation have not proven to be useful in telephone networking. Wile transformers have been successfully utilized in telephone network, they have certain inherent defects because of their physical structure and size. By their very nature, they are susceptible to outside magnetically induced spurious noises and they are bulky and heavy. In certain communication interfaces, as for instance in modems and the like, the physical bulkiness of the transformers is considered disadvantageous.

As telephone communication systems become more complex, it has become desirable and necessary to reduce the physical size of the same and reduce the number of components so as to reduce the cost and complex of the device, yet maintaining and improving the performance.

BRIEF DESCRIPTION OF THE INVENTION

In view of the above, it is a broad object of this invention to provide a telecommunication 2 wire to 4 wire coupling network which utilizes solid state devices. It is a further object of this invention to provide coupling devices which are not susceptible to electromagnetic noise coupling. It is a further object of this invention to provide a device which is easily matched to the existing telephone networks and which automatically compensates for loop length changes while providing for voltage isolation between the local power supply network and the telephone network.

These and other objects, as will become evident from the remainder of this specification, are achieved in an analog coupling device for coupling a first circuit to at least one second circuit wherein said first circuit carries a DC carrier voltage and at least one AC signal, said device which comprises: said first circuit including at least one first circuit optical emitting means, said optical emitting means for transmitting an optical signal, said first circuit further including a first circuit optical receiving means, said optical receiving means for receiving an optical signal; said first circuit further including a loading means for introducing a resistance in said first circuit so as to produce a DC current in said first circuit in response to a voltage applied to said first circuit; said second circuit including second circuit optical emitting means for transmitting an optical signal, said second circuit emitting means located in operative association with said first circuit optical receiving means; said second circuit further including second circuit optical receiving means for receiving an AC optical signal, said second circuit optical receiving means located in operative association wit said first circuit optical emitting means, said second circuit optical receiving means including a reverse biased photo sensitive pn junction.

In the illustrative embodiment of the invention, the second circuit includes transmitting circuit and a receiving circuit. These are isolated from the first circuit optical emitting means and the first circuit optical receiving means by locating them in conjunction with the second circuit optical emitting means and the second circuit optical receiving means respectively. In the illustrative embodiment, when applied to a telephone network adapted for transmission and receipt of optical signals, first and second optical couplers are utilized for the transmitting and receiving circuits of such a system.

In the illustrative embodiment a transistor can be utilized for the reversed bias photo sensitive pn junction. When a transistor is utilized for this pn junction, the collector is left open. In the illustrative embodiment, with such an open collector transistor, its base is connected through a resistor to a lower potential than is its emitter.

In the illustrative embodiment the first circuit further includes a DC polarity reversing bridge. In many older telephone systems, a switching network is provided to reverse the polarity of the DC carrier signal upon completion of connection. By providing a reverse bridging means, the polarity reversal is isolated from the transmitting and receiving circuits of the invention.

The loading means provides a resistance in the first circuits so as to regulate the current through the first circuit. Additionally, the loading means can further include an impedance inducing means so as to provide an impedance match in the first circuit with telephone network.

BRIEF DESCRIPTION OF THE DRAWINGS

This invention will be better understood when taken in conjunction with the drawings wherein.

This invention utilizes certain principles and/or concepts as are set forth in the claims appended hereto. Those skilled in the electrical arts will realize that these principles and/or concepts are capable of being utilized in a variety of embodiments which may differ from the embodiment utilized for illustrative purposes herein. For this reason this invention is not to be construed as being limited solely to the illustrative embodiment, but should only be construed in view of the claims.

DETAILED DESCRIPTION OF THE INVENTION

Figure 1:
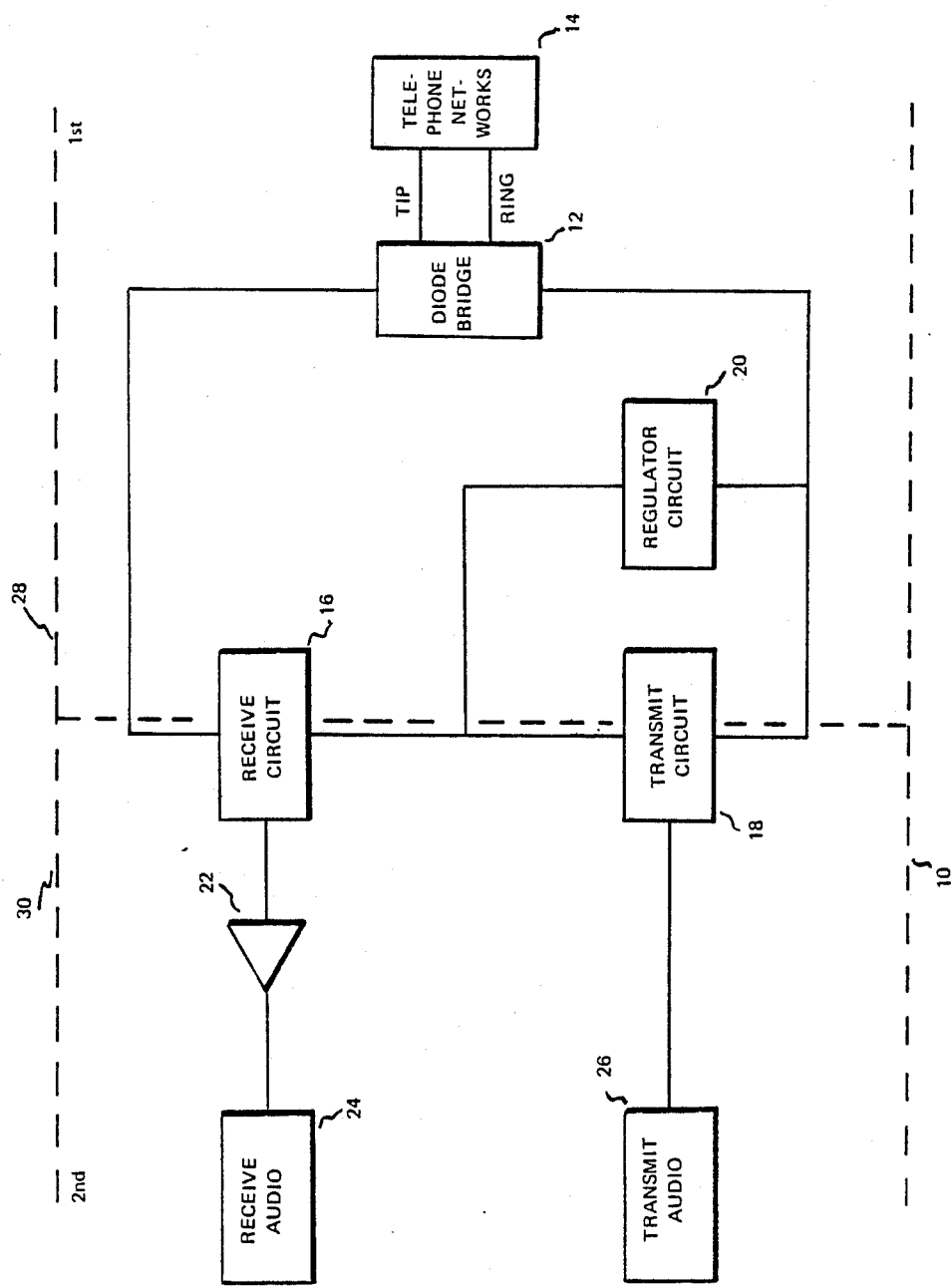
FIG. 1 is a block diagram showing the circuitry of the invention utilized in association with a telephone network.

In FIG. 1 the coupling device of the invention is coupled to a typical telephone network. The device 10 interacts with the 2 wire tip and ring telephone lines of a telephone network 14. These are fed to a diode bridge 12 which is introduced into the circuitry of the coupling device in order to insure constant polarity to other elements within the circuitry. In telephone circuits which are fixed as to their polarity, these would be redundant. But in networks where polarity reversals are utilized, the bridge 12 assures correct polarity. The line at positive potential from bridge 12 leads to a receiver circuit 16. A transmitter circuit 18 and a regulator circuit 20 are in parallel with one another between the receiver circuit 16 and the negative side of the diode bridge 12.

The receiver circuit 16 feeds a receiver amplifier 22 which, in turn, is connected to a receiver output device 24. The receiver output device can be any one of several types of devices such as speakers, modems, demodulators, and the like.

The transmitter circuit in a similar manner is connected to a transmitter input device 26. This device can be any one of several devices such as a microphone, a modem, a modulator, or the like, in the same manner as the receiver output device.

The receiver circuit 16 and the transmitter circuit 18 couple a first circuit 28 to a second circuit 30. Portions of the transmitter circuit 18 and the regulator circuit 20 serve as a load for the first circuit 28 whereby a DC current flows in response to imposing of the 48 volt signal at the tip and ring lines of the telephone network 14.

As hereinafter explained in greater detail, both the receiver circuit 16 and the transmitter circuit 18 utilize optical coupled devices to transfer signals back and forth between the respective first circuit 28 and the second circuit 30. The first circuit 28 and the second circuit 30 are electrically isolated from one another and are only connected optically via the optical couplers. This achieves isolation of the first circuit 28 and the second circuit 30 to isolation the incompatible grounds of these two circuits from one another without having to resort to the use of transformers and the like.

Incoming signal from the diode bridge 12 is fed to the receiver circuit 16 at which point it is picked off and fed to the amplifier 22 for further propagation to the receiver output device 24. The receiver circuit 16 outputs a signal of substantially constant amplitude over a wide range of input D.C. current from the telephone network 14. This is achieved utilizing a reversed bias pn junction within the receiver circuit 16. Utilization of a reversed bias pn conjunction achieves automatic gain control as hereinafter explained. Utilization of an optical coupler within the receiver circuit 16 achieves a physical isolation of a first circuit 28 and the second circuit 30, yet allows for propagation of the incoming signal to the amplifier 22.

The transmitter circuit 18 provides for input of signals into the first circuit 28 via the transmitter input device 26. It also serves further functions in association with the regulator circuit 20. These include AC impedance matching with the first circuit 28, DC resistance matching with the first circuit 28, and provides for voltage regulation within the first circuit 28.

Within the transmitter circuit 18, an optical coupler device is utilized for inputting signals from the second circuit 30 to the first circuit 28. Portions of the opticl coupling device are also utilized in the impedance match, the resistance matching, and the voltage regulation.

Figure 2:
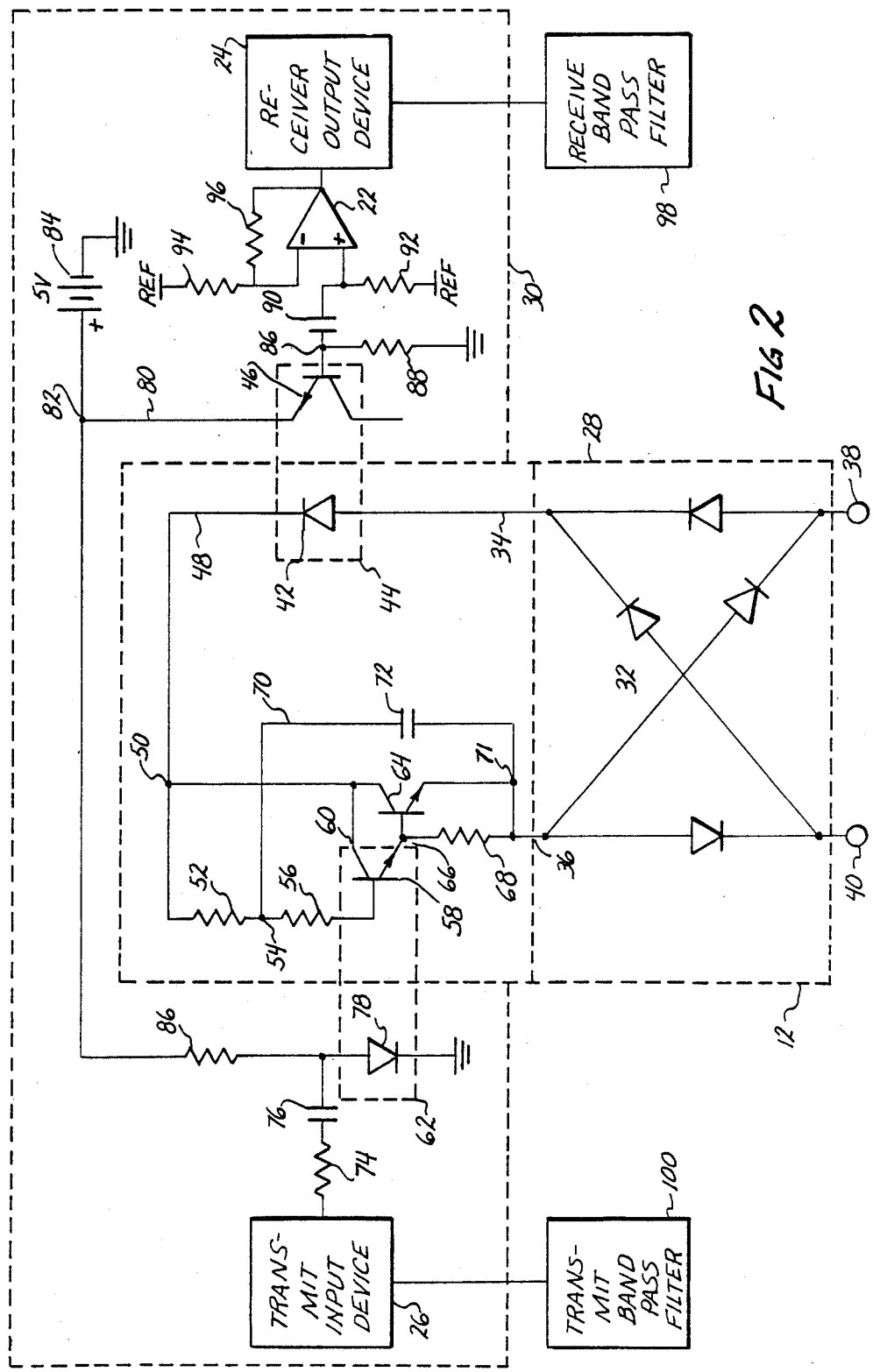
FIG. 2 is a circuit diagram of an embodiment of the invention.

In FIG. 2 it is immediately obvious that circuit 28 is totally electrically isolated from circuit 30. Typically, this isolation is on the order of about 4,000 volts potential difference between the two circuits. This is achieved as per the device described below.

The diode bridge 12 consists of four (4) diodes collectively identified by the numeral 32 which are located in a normal bridge array such that line 34 is always at positive potential, and line 36 at negative potential. As was discussed above, it is sometimes the practice in certain phone networks to reverse the polarity on input lines 38 and 40. The presence of the bridge 12 insures the constant polarity of lines 34 and 36.

Line 34 connects to diode 42 located within optical coupler 44. Suitable for optical coupler 44 is a TI 4N25 available from Texas Instruments. The optical coupler 44 also includes an npn transistor 46 integrally formed in association with the diode 42. The diode 42 is connected to the first circuit 28, and the npn transistor 46 is connected to the second circuit 30. The npn transistor 46 serves as a detector for receipt of signals from the first circuit 28 in response to signals received from the telephone network 14.

Line 48 leads from diode 42 to a junction 50. One leg of junction 50 connects to resistor 52. The resistor 52 connects to a further junction 54. One of the leads from junction 54 is connected to resistor 56 which is connected to the base 58 of a further npn transistor 60 located within optical coupler 62. The optical coupler 62 can also be a TI 4N25 device.

The collector of transistor 60 is connected to junction 50, and further connected to the collector of an additional npn transistor 64. The emitter of transistor 60 is connected to a junction 66 which connects to the base of transistor 64 and a resistor 68.

Line 70 from junction 54 connects to a capacitor 72. The other side of capacitor 72, in turn, is connected to a junction 71 leading from the emitter of transistor 64 which then connects to line 36.

As noted above, the transmit circuit 18 and the regulator circuit 20, together, serve as a voltage regulator. The forward biased base emitter voltage of transistor 64 is relatively constant. The collector current of transistor 60 is governed by the base emitter voltage of transistor 64 divided by the value of resistor 68. The current flowing through the transistor 60, divided by the current gain of transistor 60, yields the base current of the base 58 of the transistor 60. In turn, that base current multiplied by the sum of resistors 52 and 56 is a voltage. This voltage, combined with the voltage across both of the base emitters of the transistors 60 and 64, comprises the regulated voltage across the combination of the transistor circuit 18 and the regulator circuit 20.

The voltage across the total of the transmit circuit 18 and the regulator circuit 20, in conjunction with the current flowing through the first circuit 28, yields the DC resistance of the first circuit 28.

The AC impedance of first circuit 28 is established by resistor 52 and capacitor 72. The capacitor 72 forms a bypass across the circuitry of the two transistors 60 and 64. The values of resistors 52 and capacitor 72 are selected so as to yield a total impedance of 600 ohms over the frequency range of a typical telephone network of 300 Hz to 3 KHz.

The DC resistance of the first circuit 28 is established as was described for the voltage regulation above. For a typical telephone network this is generally set at a 100 ohms with values varying up to about 200 ohms.

The transmitter input device 26, connected via resistor 74 and capacitor 76 to diode 78, forms a part of the optical coupler 62. signal input from the device 26 is fed to the diode 78 which, in turn, emits a modulated optical signal corresponding to the signal of the device 26. This optical signal is transferred across the optical coupler 62 to the base emitter of transistor 60 for amplification by the transistor 60 and the transistor 64. These, in turn, feed signal into the first circuit 28, and, ultimately, to the telephone network via the lines 38 and 40. This is an AC signal imposed upon the DC carrier signal within the lines 38 and 40.

The junction 82 is at positive potential of 5 volts via a power supply 84. A resistor 86 connected to junction 82 couples the transmitter input device 26 to power supply 84. The receiver output device 24 is coupled via the output of the diode 42 of the optical coupler 44. The emitter of the transistor 46 is connected via line 80 to a junction 82.

The transistor 46 is reversed biased via connection of its emitter to the positive potential of the power supply 84. The collector of the transistor 46 is open circuited. As such, transistor 46 is, in essence, nothing more than a reversed bias pn junction. Alternately to leaving the collector of the transistor 46 open, it could be connected to the base. However, it is preferred to simply leave it open.

The base of the transistor 46 is connected to junction 86 which s connected to ground via resistor 88. Amplifier 22 is connected via capacitor 90 to junction 86. Resistor 92 sets the bias for amplifier 22 and provides a high impedance so as not to load junction 86. Resistors 94 and 96 serve to control the gain of the amplifier 22.

In response to input signal passing through the diode 42, the diode 42 emits a corresponding optical signal. This optical signal, which is variable depending upon the signal inputted to the diode 42, is received at the base emitter junction of the transistor 46. As noted above, this base emitter junction is reverse bias. This has a very important implication.

In effect, there are three signals which are fed to the diode 42 of the optical coupler 44. One of these is the DC quiescent signal and another is an AC signal carrying appropriate communicaton information from the telephone network. The DC quiescent signal is, at all times, a much stronger signal than the AC information signal. On top of this, a side tone feedback signal from the transmitter circuit 18 is also imposed onto the diode 42. As with the DC quiescent signal, this is also a strong signal of a value much greater than the AC signal which must be read and supplied to the receiver output device 24.

Because the base emitter junction of the transistor 46 is reversed bias, it is sensitive to the corresponding optical AC signal outputted by the diode 42 even in the presence of the larger DC quiescent signal and the AC side tone signal from the transistor circuit 18.

While we do not wish to be bound by theory, since the collector of transistor 46 is open, it has no current gain and, as such, the optical signal, outputted by the diode 42 in response to the DC quiescent signal, is essentially lost, whereas the AC signal is propagated. This includes both the AC signal carrying the information inputted from the telephone network, as well as the AC side tone signal introduced into the circuit by the transmitter circuit 18. For telephone usage, since it is, in fact, advantageous to simultaneously hear the audio output to a transmitter device, this imposition of the AC side tone is a positive feature of this circuitry. For modem operation, a receiver band pass filter 98 would be associated with the receiver output device 24, and a transmit band pass filter 100 would be associated with the input device 26 so as to reduce cross channel interference between the transmit and receipt portions of the device to eliminate the side tone signal at the receiver output device 24.

While, for the purposes of illustration, circuit 28 has been described as coupled with only a single second circuit 30, it can also be coupled with multiples of the second circuit 30.

I claim:

1. An analog coupling device for coupling a first circuit to at least one second circuit wherein said first circuit includes a DC carrier voltage and at least one AC signal, said device which comprises:
   said first circuit including a loading means for introducing a resistance in said first circuit so as to produce a DC current in said first circuit in response to a voltage applied to said first circuit;
   said first circuit further including at least one first circuit optical emitting means, said first circuit optical emitting means for transmitting an optical signal wherein said optical signal is indicative of both said DC current and said AC signal, said first circuit further including a first circuit forward biased optical receiving means, said first circuit forward biased optical receiving means for receiving an optical signal;
   said second circuit including second circuit optical emitting means for transmitting an optical signal, said second circuit emitting means located in operative association with said first circuit forward biased optical receiving means;
   said second circuit further including second circuit optical receiving means for receiving an optical signal, said second circuit optical receiving means located in operative association with said first circuit optical emitting means, said second circuit optical receiving means including a reverse biased photo sensitive pn junction.

2. The device of claim 1 wherein:
   said second circuits includes transmitter and receiving circuits, said second circuit emitting means located in sid second circuit transmitting circuit, said second circuit receiving means located in said second circuit receiving circuit.

3. The device of claim 1 wherein:
   said second circuit further includes an AC signal generating means, said AC generating means for generating an AC signal.

4. The device of claim 3 wherein:
   said generated AC signal is carried by said optical signal transmitted by said second circuit emitting means so as to be introduced into said first circuit.

5. The device of claim 1 wherein:
   said second circuit receiving circuit includes a reversed biased photovoltaic diode means.

6. The device of claim 1 wherein:

said second circuit receiving means includes a reversed biased npn transistor.

7. The device of claim 6 wherein:
said npn transistor has an open collector.

8. The device of claim 6 wherein:
said npn transistor includes a resistor connected to the base of said npn transistor.

9. The device of claim 1 wherein:
said first circuit includes a DC polarity reversing bridge means.

10. The device of claim 1 wherein:
said loading means is further capable of introducing an impedance into said first circuit.

11. The device of claim 1 wherein:
said first circuit optical emitting means includes a light emitting diode.

12. The device of claim 1 wherein:
said second circuit optical emitting means includes a light emitting diode.

13. The device of claim 1 wherein:
said reverse biased photo sensitive pn junction is located on a transistor having an open collector.

14. The device of claim 13 wherein:
said transistor is an npn transistor.

15. The device of claim 14 wherein:
said npn transistor has an open collector;
said npn transistor includes a resistor connected to the base of said npn transistor.

16. The device of claim 13 wherein:
said loading means is further capable of introducing an impedance into said first circuit.

17. The device of claim 16 wherein:
said second circuits includes transmitter and receiving circuits, said second circuit emitting means located in said second circuit transmitting circuit, said second circuit receiving means located in said second circuit receiving circuit.

18. The device of claim 7 wherein:
said loading means is further capable of introducing an impedance into said first circuit.

19. The device of claim 2 wherein:
said second circuit receiving circuit includes a reversed biased photovoltaic diode means.

20. The device of claim 2 wherein:
said second circuit receiving means includes an npn transistor;
said npn transistor has an open collector.

21. An isolation device for use with a telephone network wherein said network includes tip and ring network lines, said device comprising;
a first circuit, said first circuit connecting in series with said tip and ring network lines;
said first circuit including a forward biased first circuit optical signal emitting means and a first circuit forward biased optical receiving means each connected in series in said first circuit;
a second circuit, said second circuit electrically isolated from said first circuit and optically connected to said first circuit;
said second circuit including a second circuit optical emitting means, said second circuit optical emitting means optically associated with said first circuit optical receiving means whereby said first circuit optical receiving means receives optical signals from said second circuit optical emitting means;
said second circuit including a reversed biased photo sensitive second circuit optical receiving means, said second circuit optical receiving means optically coupled with said first circuit optical emitting means so as to receive optical signals from said first circuit optical emitting means.

22. A device of claim 21 wherein:
said first circuit optical receiving means includes a forward biased bipolar transistor;
said second circuit optical receiving means includes a reverse biased pn junction.

23. A circuit isolation device which comprises:
a first circuit, said first circuit including a first circuit forward biased LED and a first circuit forward biased bipolar transistor connected together in series;
a second circuit, said second circuit including a second circuit LED and a reverse biased photo sensitive pn junction;
said second circuit LED optically connected with the base emitter junction of said first circuit bipolar transistor;
said first circuit LED optically connected with said second circuit pn junction.

24. A circuit isolation device which comprises:
a first circuit, said first circuit including a first circuit forward biased LED and a first circuit forward biased bipolar transistor connected together in series;
a second circuit, said second circuit including a second circuit LED and a reverse biased photo sensitive pn junction;
said second circuit LED optically connected with the base emitter junction of said first circuit bipolar transistor;
said first circuit LED optically connected with said second circuit pn junction; and
a first circuit buffer transistor and a resistor, one of the leads of said resistor connected to the emitter of said buffer transistor, the other of the leads of said resistor and the base of said buffer transistor connected to the emitter of said first circuit forward biased bipolar transistor, the collector of said first circuit forward biased bipolar transistor and the collector of said buffer transistor connected to the cathode of said first circuit LED.

25. An isolation device for use with a telephone network wherein said network includes tip and ring network lines, said device comprising;
a first circuit, said first circuit connecting in series with said tip and ring network lines;
said first circuit including a forward biased first circuit optical signal emitting means and a first circuit forward biased optical receiving means each connected in series in said first circuit;
a second circuit, said second circuit electrically isolated from said first circuit and optically connected to said first circuit;
said second circuit including a second circuit optical emitting means, said second circuit optical emitting means optically associated ·vith said first circuit optical receiving means whereby said first circuit optical receiving means receives optical signals from said second circuit optical emitting means;
said second circuit including a reversed biased photo sensitive second circuit optical receiving means, said second circuit optical receiving means optically coupled with said first circuit optical emitting means so as to receive optical signals from said first circuit optical emitting means;

said first circuit optical receiving means includes a forward biased bipolar transistor; and said second circuit optical receiving means includes a reverse biased photo sensitive base emitter pn junction.

26. An analog coupling device for coupling a first circuit to at least one second circuit wherein said first circuit includes a DC carrier voltage and at least one AC signal, said device which comprises:

said first circuit including a loading means for introducing a resistance in said first circuit so as to produce a DC current in said first circuit in response to a voltage applied to said first circuit;

said first circuit further including at least one first circuit optical emitting means, said first circuit optical emitting means for transmitting an optical signal wherein said optical signal is indicative of both said DC current and said AC signal, said first circuit further including a first circuit forward biased optical receiving means, said first circuit forward biased optical receiving means for receiving an optical signal;

said second circuit including second circuit optical emitting means for transmitting an optical signal, said second circuit emitting means located in operative association with said first circuit forward biased optical receiving means; and said second circuit further including second circuit optical receiving means for receiving an optical signal, said second circuit optical receiving means located in operative association with said first circuit optical emitting means, said second circuit optical receiving means including a reverse biased photo sensitive base emitter pn junction.

27. An analog coupling device for coupling a first circuit to at least one second circuit wherein said first circuit includes a DC carrier voltage and at least one AC signal, said device which comprises:

said first circuit including a loading means for introducing a resistance in said first circuit so as to produce a DC current in said first circuit in response to a voltage applied to said first circuit;

said first circuit further including at least one first circuit optical emitting means, said first circuit optical emitting means for transmitting an optical signal wherein said optical signal is indicative of both said DC current and said AC signal, said first circuit further including a first circuit forward biased optical receiving means, said first circuit forward biased optical receiving means for receiving an optical signal, and wherein the total DC resistance of said first circuit at 20 milliamps of current is less than 200 ohms;

said second circuit including second circuit optical emitting means for transmitting an optical signal, said second circuit emitting means located in operative association with said first circuit forward biased optical receiving means; and said second circuit further including second circuit optical receiving means for receiving an optical signal, said second circuit optical receiving means located in operative association with said first circuit optical emitting means, said second circuit optical receiving means including a reverse biased photo sensitive pn junction.

28. An analog coupling device for coupling a first circuit to at least one second circuit wherein said first circuit includes a DC carrier voltage and at least one AC signal, said device which comprises:

said first circuit including a loading means for introducing a resistance in said first circuit so as to produce a DC current in said first circuit in response to a voltage applied to said first circuit;

said first circuit further including at least one first circuit optical emitting means, said first circuit optical emitting means for transmitting an optical signal wherein said optical signal is indicative of both said DC current and said AC signal, said first circuit further including a first circuit forward biased optical receiving means, said first circuit forward biased optical receiving means for receiving an optical signal;

said first circuit optical emitting means wired in series in said first circuit such that all current conducted in said first circuit passes through said first circuit optical emitting means;

said second circuit including second circuit optical emitting means for transmitting an optical signal, said second circuit emitting means located in operative association with said first circuit forward biased optical receiving means; and said second circuit further including second circuit optical receiving means for receiving an optical signal, said second circuit optical receiving means located in operative association with said first circuit optical emitting means, said second circuit optical receiving means including a reverse biased photo sensitive pn junction.

29. An isolation device for use with a telephone network wherein said network includes tip and ring network lines, said device comprising;

a first circuit, said first circuit connecting in series with said tip and ring network lines;

said first circuit including a forward biased first circuit optical signal emitting means and a first circuit forward biased optical receiving means each connected in series in said first circuit and wherein the total current conducted in said first circuit passes through said first circuit optical signal emitting means;

a second circuit, said second circuit electrically isolated from said first circuit and optically connected to said first circuit;

said second circuit including a second circuit optical emitting means, said second circuit optical emitting means optically associated with said first circuit optical receiving means whereby said first circuit optical receiving means receives optical signals from said second circuit optical emitting means; and said second circuit including a reversed biased photo sensitive second circuit optical receiving means, said second circuit optical receiving means optically coupled with said first circuit optical emitting means so as to receive optical signals from said first circuit optical emitting means.

30. A circuit isolation device which comprises:

a first circuit, said first circuit including first and second input junctions;

said first circuit further including a first circuit forward biased LED connected in series with said first input junction and a first circuit forward biased bipolar transistor connected with said second input junction, said LED further connected to said forward biased bipolar transistor, said series connection between said LED and said first input junction comprising the only pathway in said first circuit between said first input junction and said LED;

a second circuit, said second circuit including a second circuit LED and a reverse biased photo sensitive pn junction;

said second circuit LED optically connected with the base emitter junction of said first circuit bipolar transistor; and said first circuit LED optically connected with said second circuit photo sensitive pn junction.

31. An analog coupling device for coupling a first circuit to at least one second circuit wherein said first circuit includes a DC carrier voltage and at least one AC signal, said device which comprises:

said first circuit including a loading means for introducing a resistance in said first circuit so as to produce a DC current in said first circuit in response to a voltage applied to said first circuit;

said first circuit further including at least one first circuit optical emitting means, said first circuit optical emitting means for transmitting an optical signal wherein said optical signal is indicative of both said DC current and said AC signal, said first circuit further including a first circuit forward biased optical receiving means, said first circuit forward biased optical receiving means for receiving an optical signal, together said first circuit optical emitting means and said first circuit forward biased optical receiving means containing not more than three forward biased junctions;

said second circuit including second circuit optical emitting means for transmitting an optical signal, said second circuit emitting means located in operative association with said first circuit forward biased optical receiving mens; and said second circuit furthe rincluding second circuit optical receiving means for receiving an optical signal, said second circuit optical receiving means located in operative association with said first circuit optical emitting means, said second circuit optical receiving means including a reverse biased photo sensitive pn junction.

32. An isolation device for use with a telephone network wherein said network includes tip and ring network lines, said device comprising;

a first circuit, said first circuit connecting in series with said tip and ring network lines;

said first circuit including a forward biased first circuit optical signal emitting means and a first circuit forward biased optical receiving means each connected in series in said first circuit, together said first circuit optical signal emitting means and said first circuit optical receiving means containing not more than three forward biased junctions;

a second circuit, said second circuit electrically isolated from said first circuit and optically connected to said first circuit;

said second circuit including a second circuit optical emitting means, said second circuit optical emitting means optically associated with said first circuit optical receiving means whereby said first circuit optical receiving means receives optical signals from said second circuit optical emitting means; and said second circuit including a reversed biased photo sensitive second circuit optical receiving means, said second circuit optical receiving means optically coupled with said first circuit optical emitting means so as to receive optical signals from said first circuit optical emitting means.

33. A circuit isolation device which comprises:

a first circuit having not more than five forward biased devices, said forward biased devices including a first circuit forwrad biased LED and two first circuit forward biased bipolar transistors;

a second circuit, said second circuit including a second circuit LED and a reverse biased photo sensitive pn junction;

said second circuit LED optically connected with the base emitter junction of one of said first circuit bipolar transistors; and said first circuit LED optically connected with said second circuit pn junction.

34. A circuit isolation device which comprises:

a first circuit, said first circuit including a first circuit forward biased LED and a first circuit forward biased bipolar transistor connected together in series;

a second circuit, said second circuit including a second circuit LED and a reverse biased photo sensitive base emitter pn junction;

said second circuit LED optically connected with the base emitter junction of said first circuit bipolar transistor; and said first circuit LED optically connected with said second circuit pn junction.

35. An isolation device for use with a telephone network wherein said network includes tip and ring network lines, said device comprising;

a first circuit, said first circuit connecting in series with said tip and ring network lines;

said first circuit including a forward biased first circuit optical signal emitting means and a first circuit forward biased optical receiving means each connected in series in said first circuit and wherein the total DC resistance of said first circuit with 20 milliamps of current is less than 200 ohms;

a second circuit, said second circuit electrically isolated from said first circuit and optically connected to said first circuit;

said second circuit including a second circuit optical emitting means, said second circuit optical emitting means optically associated with said first circuit optical receiving means whereby said first circuit optical receiving means receives optical signals from said second circuit optical emitting means; and said second circuit including a reversed biased photo sensitive second circuit optical receiving means, said second circuit optical receiving means optically coupled with said first circuit optical emitting means so as to receive optical signals from said first circuit optical emitting means.

* * * * *

UNITED STATES PATENT AND TRADEMARK OFFICE
CERTIFICATE OF CORRECTION

PATENT NO. : 4,727,535
DATED : FEBRUARY 23, 1988
INVENTOR(S) : RANDY BRANDT

It is certified that error appears in the above-identified patent and that said Letters Patent is hereby corrected as shown below:

Column 1, line 34, "audioo" should be --audio--.
Column 1, line 36, "Wile" should be --While--.
Column 2, line 17, "wit" should be --with--.
Column 3, line 47, "isolation" should be --isolate--.
Column 4, line 5, "opticl" should be --optical--.
Column 5, line 11, "signal" should be --Signal--.
Column 5, line 37, "s" should be --is--.
Column 5, line 52, "communicaton" should be --communication--.
Column 6, line 54, "sid" should be --said--.
Column 11, line 38, "furthe rincluding" should be -- further including--.
Column 12, line 13, "forwrad" should be --forward--.

Signed and Sealed this

Seventh Day of February, 1989

Attest:

DONALD J. QUIGG

*Attesting Officer*     *Commissioner of Patents and Trademarks*